US010079799B2

(12) United States Patent

Lear et al.

(10) Patent No.: US 10,079,799 B2

(45) Date of Patent: Sep. 18, 2018

(54) USING DOMAIN NAME SERVER QUERIES FOR MANAGING ACCESS CONTROL LISTS

(71) Applicant: Cisco Technology, Inc., San Jose, CA (US)

(72) Inventors: Eliot Lear, Wetzikon (CH); James Bieda, Sebastopol, CA (US)

(73) Assignee: Cisco Technology, Inc., San Jose, CA (US)

( * ) Notice: Subject to any disclaimer, the term of this patent is extended or adjusted under 35 U.S.C. 154(b) by 268 days.

(21) Appl. No.: 14/882,522

(22) Filed: Oct. 14, 2015

(65) Prior Publication Data

US 2017/0111313 A1 Apr. 20, 2017

(51) Int. Cl.
*H04L 29/12* (2006.01)
*H04L 29/06* (2006.01)

(52) U.S. Cl.
CPC ...... *H04L 61/1511* (2013.01); *H04L 63/0236* (2013.01); *H04L 61/2015* (2013.01); *H04L 61/6009* (2013.01)

(58) Field of Classification Search
CPC ............. H04L 63/0236; H04L 61/1511; H04L 61/2015; H04L 61/6009
See application file for complete search history.

(56) References Cited

U.S. PATENT DOCUMENTS 7,249,374 B1 7/2007 Lear et al.
2006/0282895 A1* 12/2006 Rentzis .................. G06F 21/56 726/24
2008/0307054 A1* 12/2008 Kamarthy ............. H04L 63/065 709/206
2009/0055900 A1* 2/2009 Gopalasetty ............ H04L 63/08 726/4
2010/0088398 A1* 4/2010 Plamondon ......... H04L 67/2852 709/220
2012/0179801 A1* 7/2012 Luna .................. H04L 61/6009 709/223
2012/0246315 A1* 9/2012 Kagan ................ H04L 61/1511 709/225
2014/0075505 A1* 3/2014 Subramanian ...... H04L 12/4641 726/3
2014/0101226 A1* 4/2014 Khandekar ......... H04L 67/1008 709/203
2015/0012864 A1* 1/2015 Goodwin ............ G06F 9/45558 715/771
2015/0256507 A1* 9/2015 Vilenski .............. H04L 61/1511 709/245

(Continued)

*Primary Examiner* — Abdullahi E Salad
(74) *Attorney, Agent, or Firm* — Parker Ibrahim & Berg LLP; James M. Behmke; Stephen D. LeBarron

(57) ABSTRACT

In one embodiment, a caching resolver receives a name server query from an end device for an Internet Protocol (IP) address for a hostname, and determines whether the hostname requested is in an access control list (ACL). In response to the hostname being in the ACL, the caching resolver examines a received response to the name server query for the hostname, wherein the received response contains a particular IP address for the hostname, and adds the particular IP address for the hostname to the ACL. In one embodiment, the ACL is local to the caching resolver, while in another embodiment, adding the particular IP address for the hostname to the ACL comprises sending a message to a remote ACL-maintaining device that maintains the ACL.

23 Claims, 12 Drawing Sheets

(56) References Cited

U.S. PATENT DOCUMENTS

| | | | | |
|---|---|---|---|---|
| 2015/0350229 | A1* | 12/2015 | Mitchell | H04L 63/1425 726/23 |
| 2016/0043923 | A1* | 2/2016 | Kagan | H04L 43/0876 709/224 |
| 2017/0033994 | A1* | 2/2017 | Hunt | H04L 41/0853 |

* cited by examiner

ACEs 350

| HOSTNAME 310 | IP ADDRESS(ES) 320 | ACCESS 330 | CACHING 340 |
|---|---|---|---|
| "X" | "IP A" | ALLOW | (RULE) |
| "Y" | "IP B" | ALLOW | (RULE) |
| • • • | • • • | • • • | • • • |
| "Z" | "IP C" | DENY | (RULE) |

FIG. 3

ACL 300

ACEs 350

| HOSTNAME 310 | IP ADDRESS(ES) 320 | ACCESS 330 | CACHING 340 |
|---|---|---|---|
| "X" | "IP A": "IP D" | ALLOW | (RULE) |
| "Y" | "IP B" | ALLOW | (RULE) |
| ••• | ••• | ••• | ••• |
| "Z" | "IP C" | DENY | (RULE) |

UPDATE

FIG. 5

USING DOMAIN NAME SERVER QUERIES FOR MANAGING ACCESS CONTROL LISTS

TECHNICAL FIELD

The present disclosure relates generally to computer networks, and, more particularly, to using domain name server (DNS) queries for managing access control lists (ACLs).

BACKGROUND

Many computer network systems process access control lists (ACLs) at line rate without making queries, as packets would otherwise be delayed or dropped. One form of an access control entry (ACE) in an ACL is a hostname, e.g., "www.cisco.com". Operating systems of packet processing devices, however, often translate hostnames into IP addresses at configuration or boot time (e.g., 95.100.176.170), rather than using the hostname. Such a method does not adhere to domain name server (DNS) caching semantics, and may lead to the wrong address being either denied access or (worse) granted access to a resource. This is particularly necessary in a world of cloud resources where host→ip address bindings may change as services migrate or change their load balancing schemes based on conditions (e.g., www.google.com may have thousands of addresses). In fact, a query for the same name from two hosts on the same network may return different IP addresses, such that a first of the IP addresses learned may be stored in the ACL, but other valid IP addresses may not be, and thus devices learning those other IP addresses may be denied access inappropriately. Worse still, it is possible that neither address might be learned.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 3 illustrates an example access control list (ACL);

FIG. 5 illustrates an example updated ACL;

DESCRIPTION OF EXAMPLE EMBODIMENTS

Overview

According to one or more embodiments of the disclosure, a caching resolver receives a name server query from an end device for an Internet Protocol (IP) address for a hostname, and determines whether the hostname requested is in an access control list (ACL). In response to the hostname being in the ACL, the caching resolver examines a received response to the name server query for the hostname, wherein the received response contains a particular IP address for the hostname, and adds the particular IP address for the hostname to the ACL. In one embodiment, the ACL is local to the caching resolver, while in another embodiment, adding the particular IP address for the hostname to the ACL comprises sending a message to a remote ACL-maintaining device that maintains the ACL.

According to one or more additional embodiments of the disclosure, a network device maintains an ACL for IP addresses for hostnames, and communicates with a caching resolver that receives name server queries from end devices associated with the network device for IP addresses for hostnames and receives responses to the name server queries. In response to receiving a particular IP address for a particular hostname that is in the ACL from the caching resolver, the network device adds the particular IP address for the particular hostname to the ACL.

Description

A computer network is a geographically distributed collection of nodes interconnected by communication links and segments for transporting data between end devices, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Figure 1:
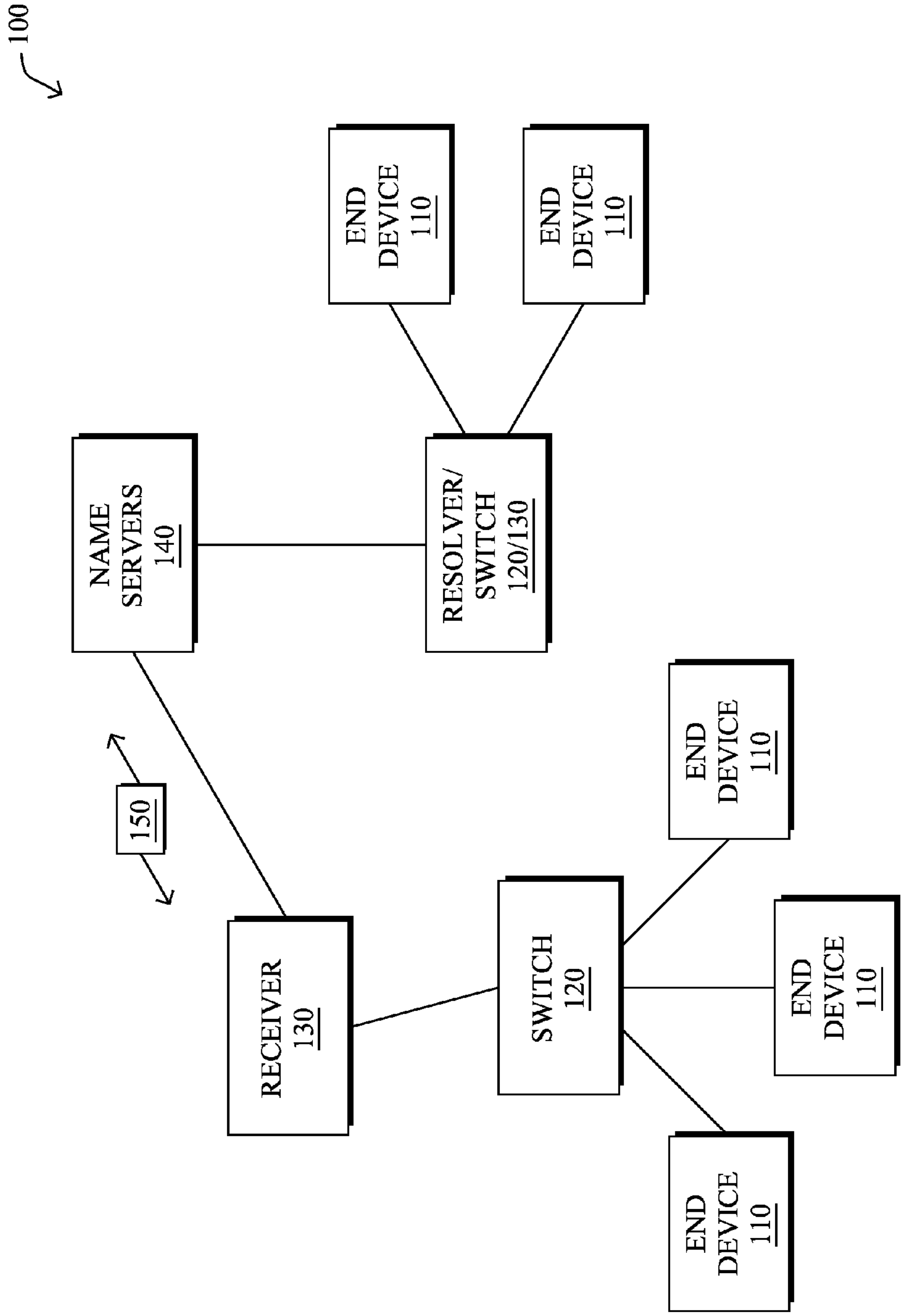
FIG. 1 illustrates an example communication network.

FIG. 1 is a schematic block diagram of an example computer network 100 illustratively comprising network devices interconnected by various methods of communication (e.g., wired links, wireless links, etc.). In particular, end devices 110 (or end devices 110) may communicate with various switches 120, caching resolvers 130, name servers 140, and so on, in a generally well-understood and adaptable configuration. Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets 150 (e.g., traffic and/or messages sent between the devices) may be exchanged among the devices of the computer network 100 using predefined network communication protocols such as certain known protocols, such as the Transmission Control Protocol/Internet Protocol (TCP/IP), the User Datagram Protocol (UDP), Asynchronous Transfer Mode (ATM), etc. In this context, a protocol consists of a set of rules defining how the nodes interact with each other, and any suitable protocol may be used herein.

Figure 2:
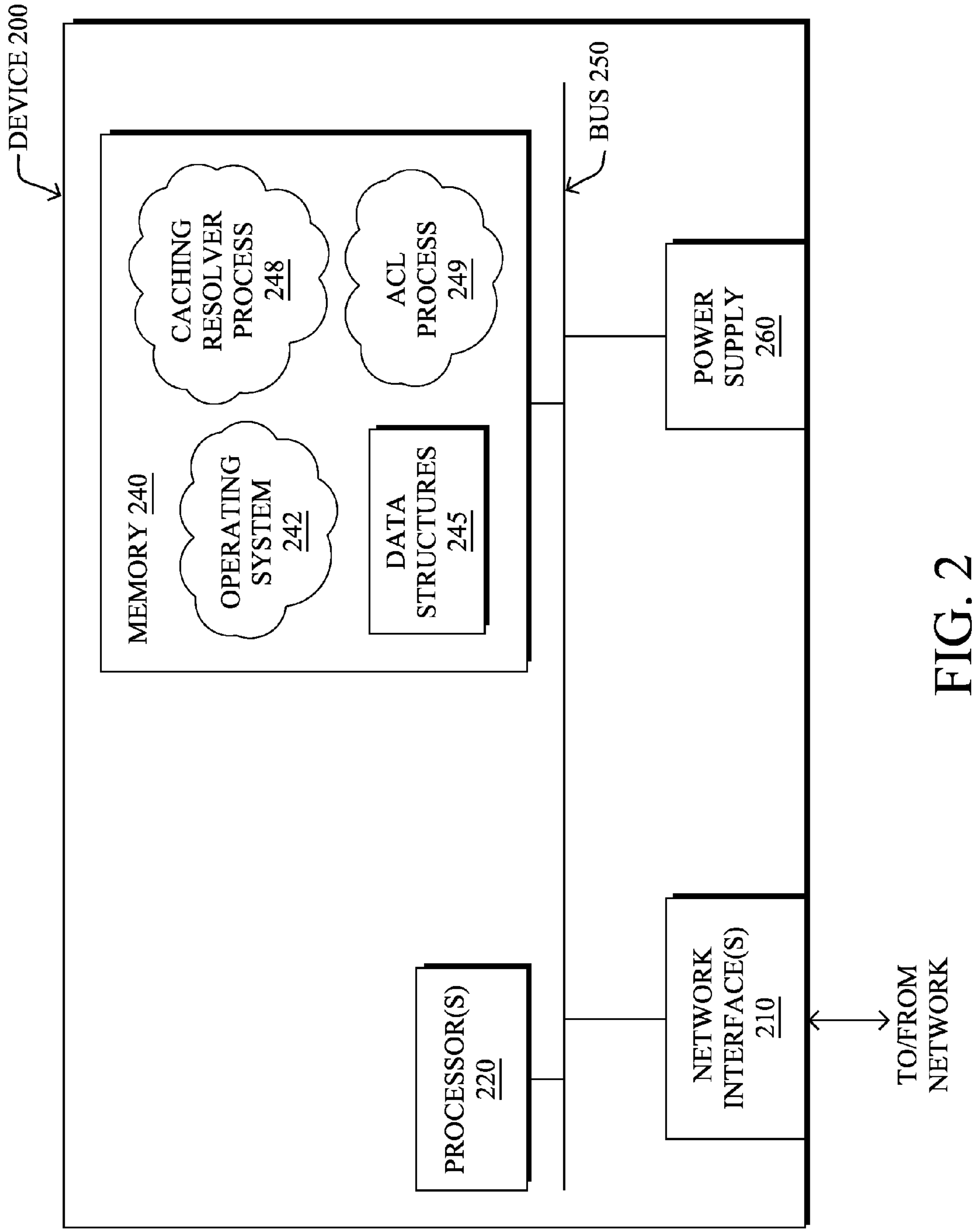
FIG. 2 illustrates an example network device/node.

FIG. 2 is a schematic block diagram of an example device 200 that may be used with one or more embodiments described herein, e.g., as any of the devices shown in FIG. 1 above (e.g., switches 120, caching resolvers 130, etc.). The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative caching resolver process 248 and/or an access control list (ACL) process 249, each as described herein. (Note that while the processes are shown in centralized memory 240, alternative embodiments allow for one or more of the processes to be operated within the network interfaces 210.)

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, many computer network systems process access control lists (ACLs) at line rate without making queries, as packets would otherwise be delayed or dropped. One form of an access control entry (ACE) in an ACL is a hostname, e.g., "www.cisco.com". Many operating systems, however, translate hostnames into IP addresses at configuration or boot time (e.g., 95.100.176.170), rather than using the hostname. However, this method does not adhere to domain name server (DNS) caching semantics, and may lead to the wrong address being either denied access or (worse) granted access to a resource. This is particularly necessary in a world of cloud resources where host→ip address bindings may change as services migrate or change their load balancing schemes based on conditions (e.g., www.google.com may have thousands of addresses). In fact, different IP addresses may be given to different devices on the same network, such that a first of the IP addresses learned may be stored in the ACL, but other valid IP addresses may not be, and thus devices learning those other IP addresses may be denied access inappropriately.

Notably, the DNS systems have generally had the notion of caching of information for usability. But DNS does not provide a way for hardware-supported ACLs to be updated when the router is not typically part of the DNS exchange. Though the router itself could query the DNS from time to time to determine whether a group of ACEs associated with a host are accurate, because different clients may in fact receive different responses, simply using caching semantics of DNS is insufficient to ensure that the right IP address is in fact allowed or blocked.

The techniques herein, therefor, learn whether an ACE update is necessary, while at the same time, no updates need occur to these access lists when they are not in use.

—Using DNS Queries for Managing ACLs—

The techniques herein use domain name server (DNS) queries for managing access control lists (ACLs) in order to provide access control to cloud-based resources. In particular, access lists with domain names are updated in real time based on the switch being a resolver, or else the switch communicating with a resolver.

Specifically, according to one or more embodiments of the disclosure as described in detail below, a caching resolver receives a name server query from an end device for an IP address for a hostname, and determines whether the hostname requested is in an ACL. In response to the hostname being in the ACL, the caching resolver examines a received response (e.g., as the intended receiver or otherwise/intercepted) to the name server query for the hostname, wherein the received response contains a particular IP address for the hostname, and adds the particular IP address for the hostname to the ACL. In one embodiment, the ACL is local to the caching resolver, while in another embodiment, adding the particular IP address for the hostname to the ACL comprises sending a message to a remote ACL-maintaining device that maintains the ACL.

Illustratively, the techniques described herein may be performed by hardware, software, and/or firmware, such as in accordance with the caching resolver process (on caching resolvers) 248 and/or on an ACL process 249 (on ACL-maintaining devices), which may each contain computer executable instructions executed by a processor 220 to perform functions relating to the techniques described herein, e.g., in conjunction with other associated processes on the respective devices. For example, the techniques herein may be treated as extensions to conventional protocols, such as various ACL, caching resolver, or DNS protocols, and as such, may be processed by similar components understood in the art that execute those protocols, accordingly.

Operationally, the techniques herein generally involve two approaches for a switch to refresh information for impacted ACEs, where both methods start and end with a query being sent and received by an end device. With each approach an answer could be associated with a specific end device. In each case, the response need not be cached simply based on DNS caching semantics but for either the life of a communication (e.g., determined within TCP by observing FIN flags) or for a configurable period of time, along with a least recently used (LRU) cache. For each of the methods, an ACE is assumed to exist that is based on a hostname.

For instance, assuming the following entry: "access-list 10 permit host xyz.example.com", the goal, then, is to provide an up-to-date understanding of what the A/AAAA (IPv4/IPv6) records for xyz.example.com are. Notably, FIG. 3 illustrates a simplified example of an ACL 300 (e.g., a data structure 245), showing ACEs 350 that have hostnames 310 and associated IP addresses 320, and access description 330. Other information, such as various caching semantics 340, may also be stored with the illustrative ACL 300. Note that the example ACL 300 is not meant to be limiting to the scope of the present disclosure, and other formats for the ACL may be used accordingly. Most notably, the ACL may have a single hostname entry 310 that is associated with multiple IP addresses 320, or else a separate hostname entry (for the same hostname) may be created for each IP address stored as described below (e.g., with associated caching semantics 340).

Figure 4A:
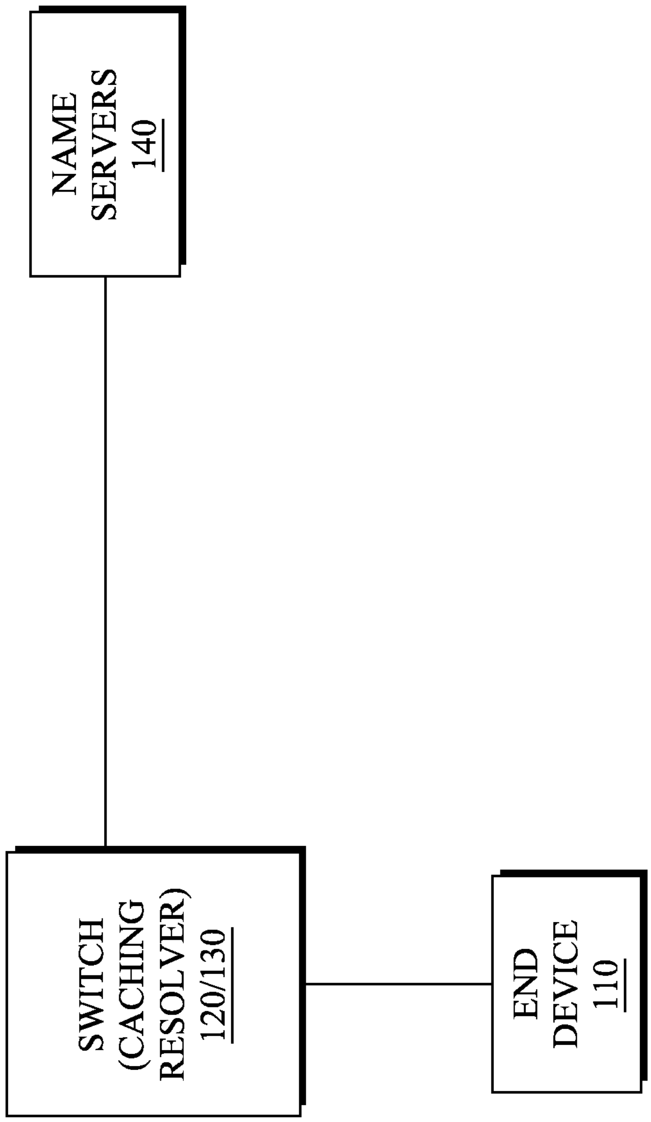
FIGS. 4A-4C illustrate an example of using domain name server (DNS) queries for managing ACLs.

FIG. 4A illustrates a specific network configuration of the computer network 100, in which a switch/firewall is configured as a caching resolver. That is, when an end device 110 is configured (e.g., via the dynamic host configuration protocol or "DHCP"), then the IP address associated with the local switch/firewall may be given as the name server to be used, and the switch/firewall then acts as a caching resolver.

Figure 4B:
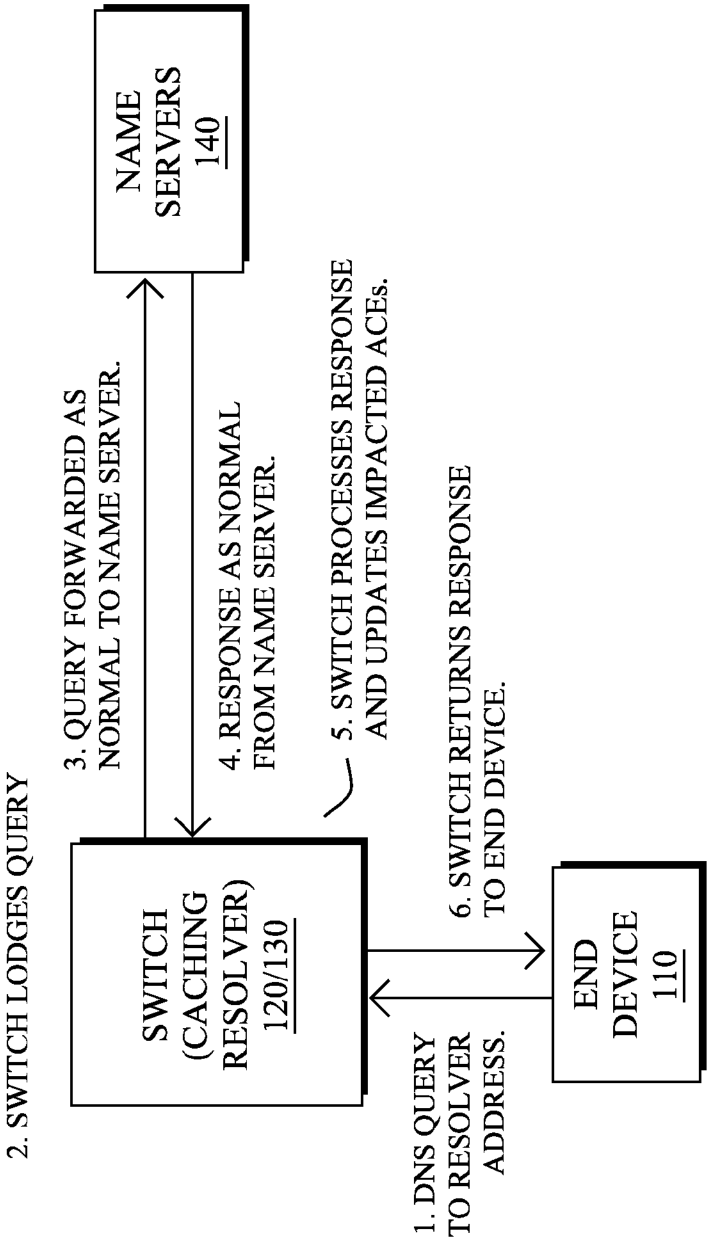

As shown in FIG. 4B (1), the end device 110 sends a DNS query to the resolver address (switch 120), which then lodges the query (2). Then, the switch may forward the query as normal to the name server (3), which then returns a conventional response (4).

Figure 4C:
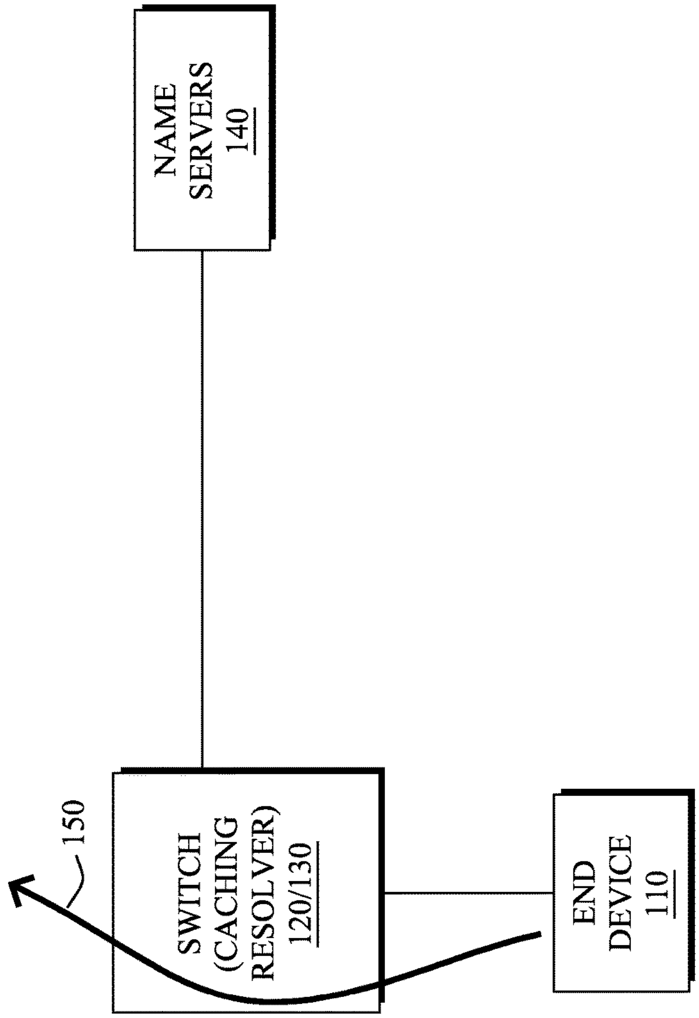

When names that are configured in ACEs are seen in the queries to the switch, the switch examines the response and adds appropriate ACE IP addresses when results found in the query response include hostnames listed in those ACEs, as shown in FIG. 4B (5). The switch also returns the response to the end device (6), accordingly. Any communication through the switch then in FIG. 4C has the up-to-date hostname IP address information, accordingly.

In particular, FIG. 5 illustrates an example updated ACL 500 (updated from ACL 300 of above-detailed FIG. 3), where an IP address "D" has been added to the entry for hostname "X", which is one of the hostnames already configured in the ACL. Note that the switch could apply caching semantics found in the query response (particularly in the event other end devices send a query for the same hostname), but this generally should not be relied on for the ACE value. Alternatively or in addition, these entries may last no longer than the end device is communicating on the network, or else may timeout after a configurable length of time (e.g., a week). (Alternatively still, a forced update operation may clear any cached entries and update the entries, accordingly.)

Figure 6A:
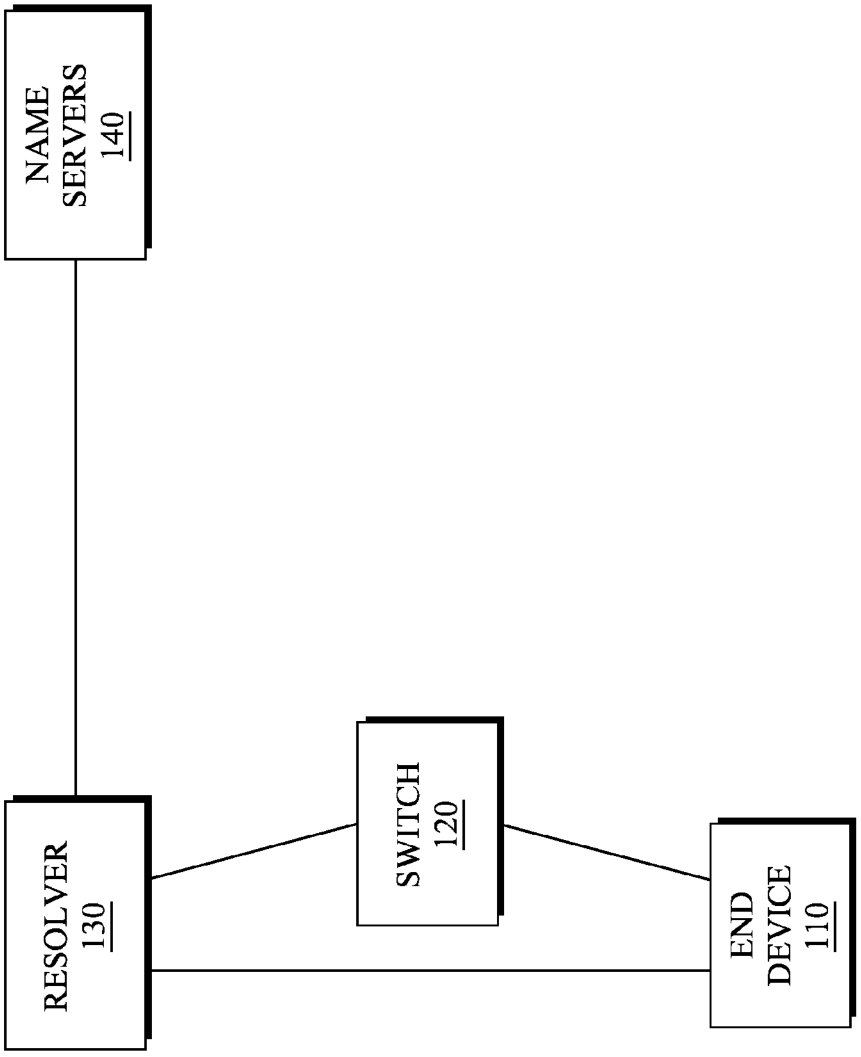
FIGS. 6A-6C illustrate another example of using DNS queries for managing ACLs.

In another embodiment, as shown in FIG. 6A, the switch/firewall 120 communicates with a "friendly" (and remote) resolver 130. Here, when an end device 110 is configured via DHCP, it is given the address of a caching resolver 130 to use as a name server. That caching resolver runs a service that informs or directly configures switches e.g., via a programmatic interface (for example, NETCONF), when a query and answer are made for hostnames the switches use in their ACEs.

Figure 6B:
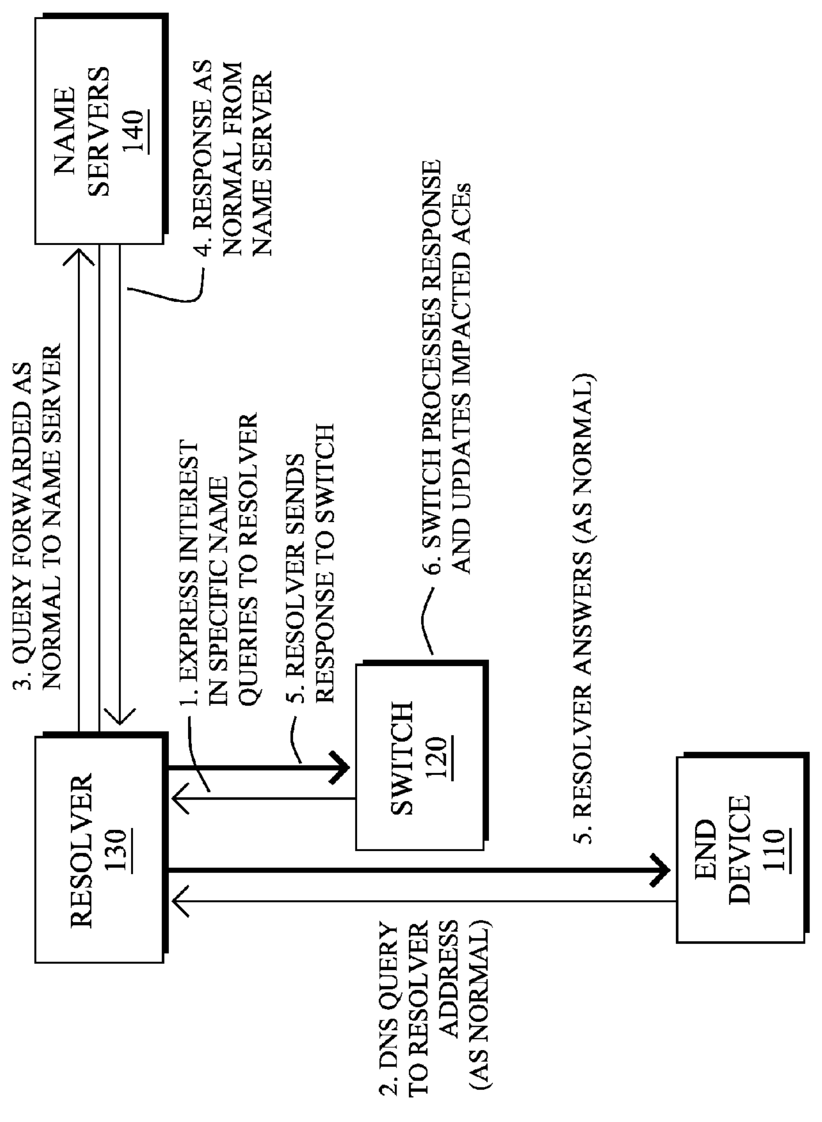

Notably, as shown in FIG. 6B (1), the switch may inform the caching resolver of those networks that it is interested in (e.g., those that have ACLs and ACEs associated with them that make use of hostnames). As the caching resolver receives this information, it updates the appropriate ACEs as shown below.

Figure 6C:
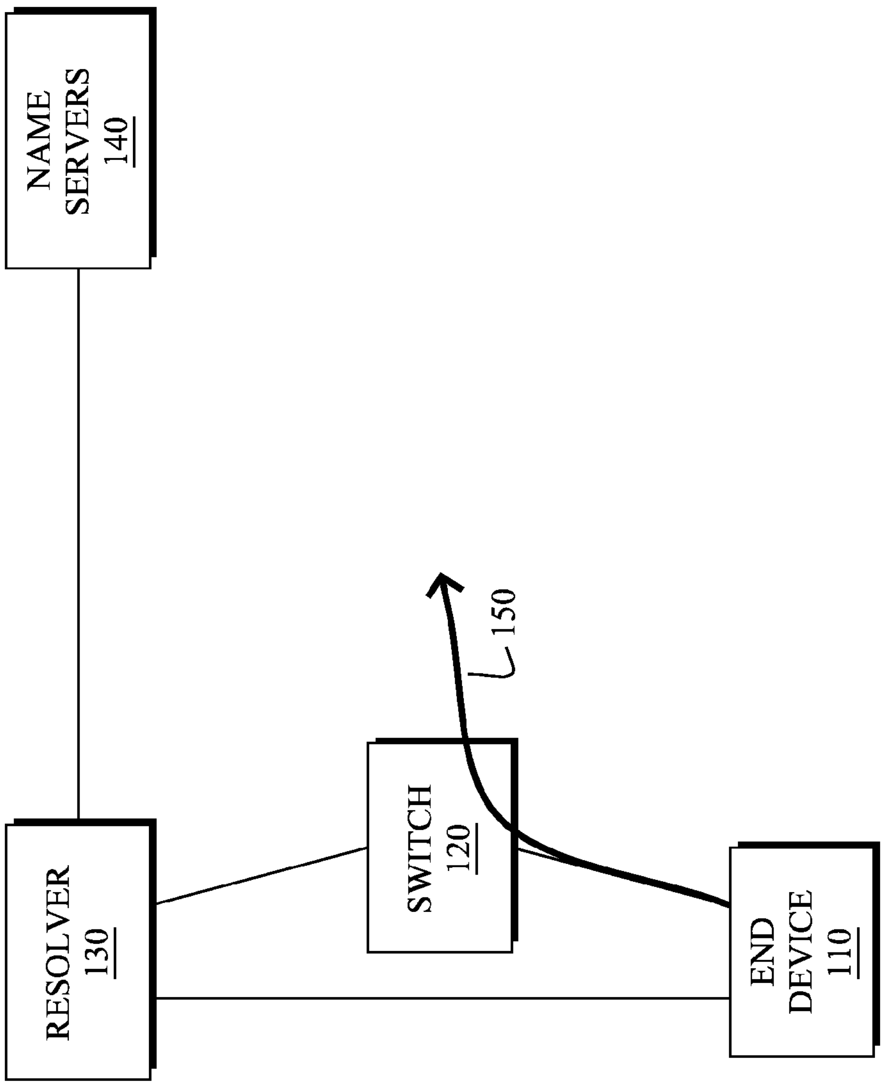

In particular, in FIG. 6B (2) the end device 110 sends a DNS query to the resolver address (resolver 130), which forwards the query as normal to the name server (3), and then receives a response from the name server (4). The resolver then returns a conventional response to the end device (5), and, when names that are configured in ACEs are seen in the queries to the resolver, also informs the switch 120 of appropriate ACE IP addresses. The switch updates the ACE(s) (6), such that any communication through the switch then in FIG. 6C has the up-to-date hostname IP address information, accordingly.

Figure 7:
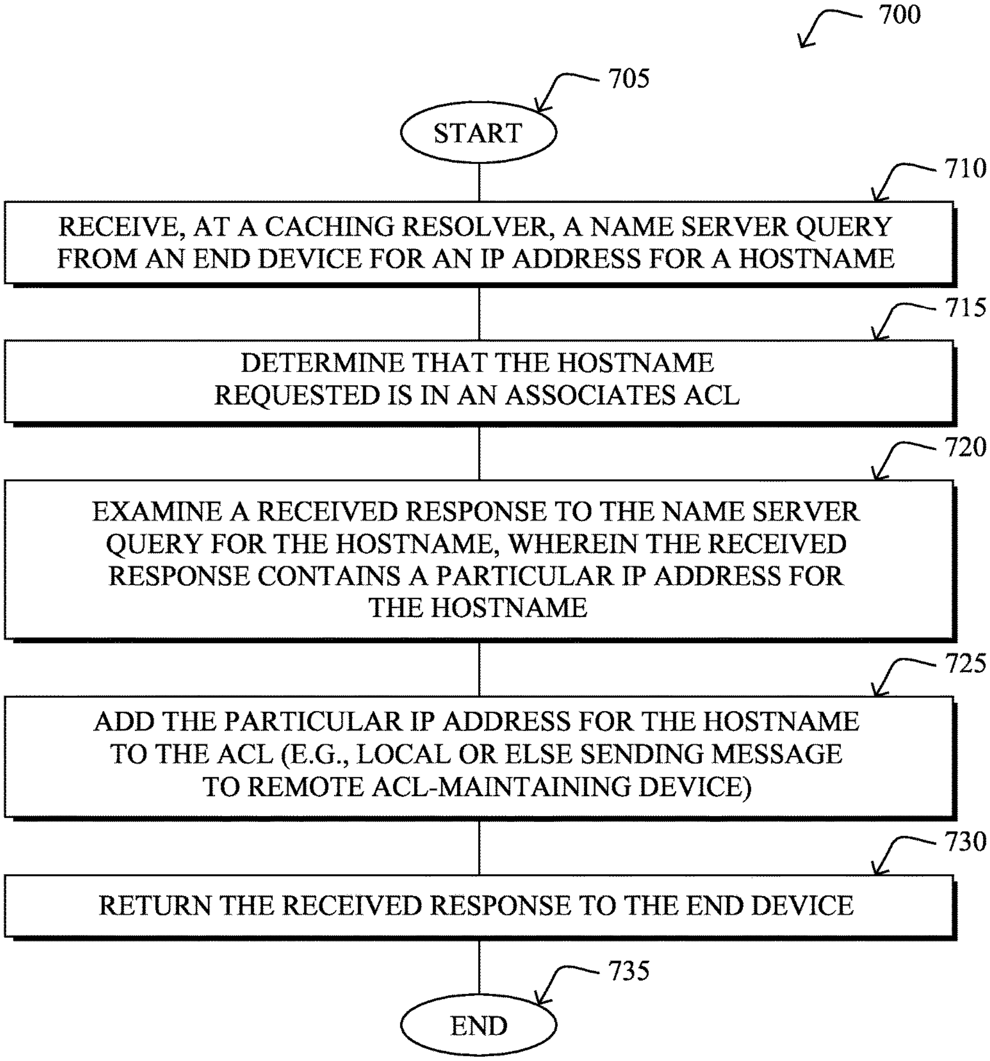
FIG. 7 illustrates an example simplified procedure for using DNS queries for managing ACLs, particularly from the perspective of a caching resolver.

Both of the situations above (FIGS. 4A-6C and FIGS. 6A-6C) will work when an end device makes use of the name-server option in DHCP. The general concept between the two situations are similar, and differ generally in the location of the ACL compared to the caching resolver. Accordingly, FIG. 7 illustrates an example simplified procedure 700 for using DNS queries for managing ACLs in accordance with one or more embodiments described herein, particularly from the perspective of a caching resolver, regardless of whether it is on a switch (or other ACL-maintaining device) with the ACL, or whether it needs to communicate with a remote ACL-maintaining device. The illustrative procedure 700 may start at step 705, and continues to step 710, where, as described in greater detail above, a caching resolver receives a name server query from an end device for an IP address for a hostname. (Note that as described above, an address of the caching resolver may be configured on the end device via a DHCP name-server option.)

Based on determining that the hostname requested is in an associated ACL (e.g., local to the caching resolver or else on a remote ACL-maintaining device that maintains the ACL) in step 715, then in step 720 the caching resolver examines a received response to the name server query for the hostname, wherein the received response contains a particular IP address for the hostname, and adds the particular IP address for the hostname to the ACL in step 725. Note that the particular IP address for the hostname may be added as an ACE into the ACL that is specific to the end device.

Note further that where the ACL is local, the caching resolver may be configured as at least one of a switch, router, and a firewall, but where the ACL is remote, then adding the particular IP address for the hostname to the ACL in step 725 comprises sending a message to a remote ACL-maintaining device (e.g., switch, router, firewall, etc.) that maintains the ACL, such as by using a programmatic interface configuration by the caching resolver to configure the remote ACL-maintaining device.

In addition, determining that the hostname is in an ACL in step 715 may also comprise determining which particular networks are of interest to the ACL-maintaining device, such that adding the particular IP address for the hostname to the ACL in step 725 is in response to the particular IP address being within a particular network of interest to the ACL-maintaining device.

In any event, the caching resolver returns the received response to the end device in step 730. Furthermore, it is worth nothing that the particular IP address for the hostname may be cached in the ACL for a configured period of time or else for a lifetime of communication between the end device and the particular IP address (e.g., clearing the cache based on a connection termination flag in a message between the end device and the particular IP address, such as a TCP "FIN" message). In another embodiment, caching semantics may be applied to the particular IP address for the hostname in the ACL based on caching semantics found in the received response.

The illustrative procedure 700 ends in step 735, although newer queries may arise, and as such, newer ACL entries may be established and/or updated/refreshed, accordingly.

Figure 8:
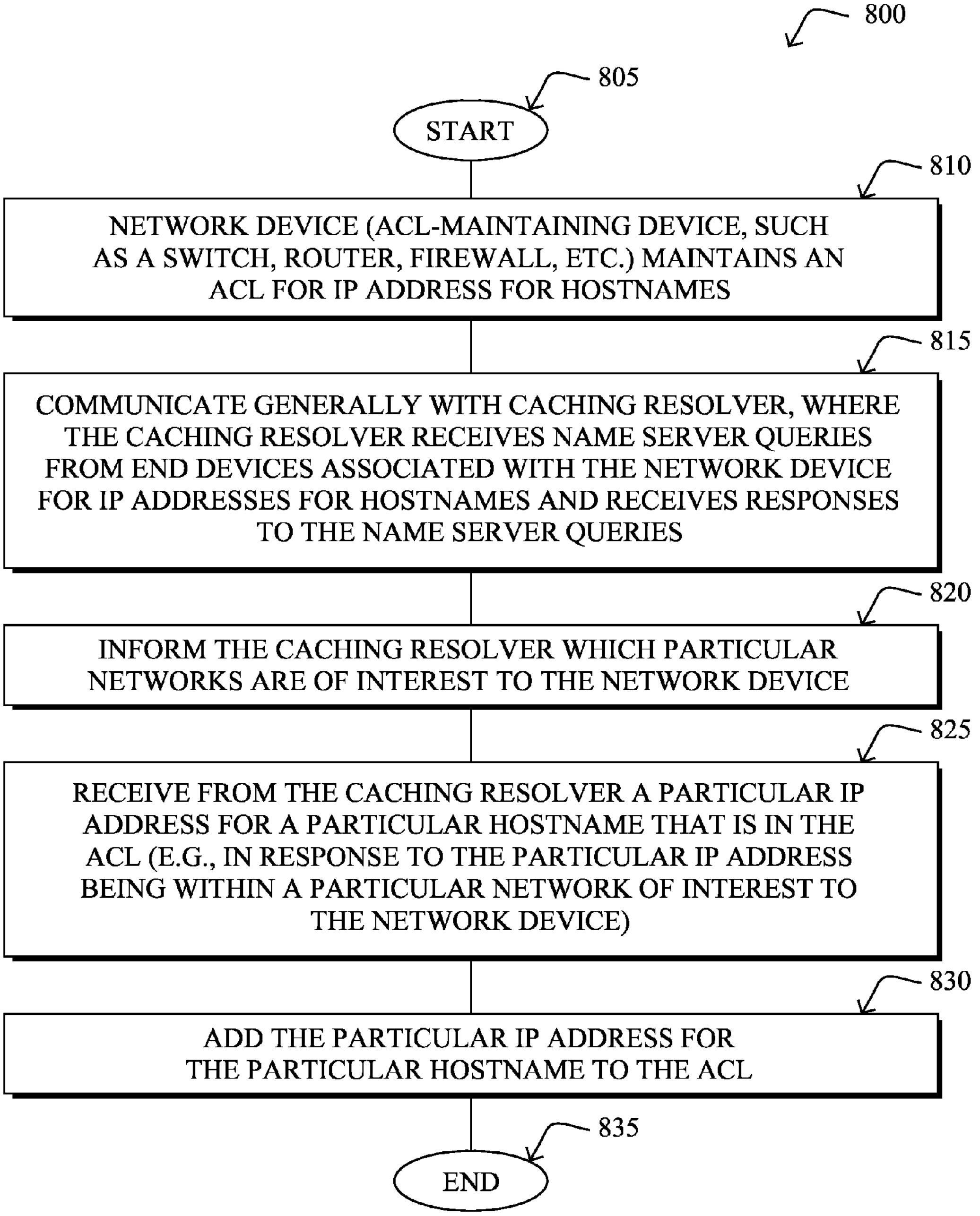
FIG. 8 illustrates another example simplified procedure for using DNS queries for managing ACLs, particularly from the perspective of an ACL-maintaining device.

FIG. 8, on the other hand, illustrates an example simplified procedure 800 for using DNS queries for managing ACLs in accordance with one or more embodiments described herein, particularly from the perspective of an ACL-maintaining device that is not the caching resolver. The illustrative procedure 800 may start at step 805, and continues to step 810, where, as described in greater detail above, the network device (ACL-maintaining device, such as a switch, router, firewall, etc.) maintains an ACL for IP addresses for hostnames. Additionally, the network device may communicate generally in step 815 with a caching resolver, where the caching resolver receives name server queries from end devices associated with the network device for IP addresses for hostnames and receives responses to the name server queries, e.g., as described above.

Optionally, in step 820, the network device may inform the caching resolver which particular networks are of interest to the network device. In step 825, the network device may receive from the caching resolver a particular IP address for a particular hostname that is in the ACL (e.g., in response to the particular IP address being within a particular network of interest to the network device), and in step 830 the particular IP address for the particular hostname may be added to the ACL. The illustrative procedure 800 may then end in step 835, though notably with the option to receive new ACL entries as described above.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide for using DNS queries for managing ACLs in a communication network. In particular, the techniques herein address the fact that hostnames in configuration have traditionally only been translated to an IP address once (when the configuration is read) and never again. The closest and most visible alternative is to simply have a resolver in the switch, and to update the ACE based on a cache timer. However, for some cloud services, cache timers are meaningless because they load balance through the use of DNS and will sometimes return different addresses even if back-to-back queries are made. The techniques herein maintain updates past whatever cache timer might be set, until communications with the end device and the IP address in question can be said to have ceased, or if the communication was denied, for some configurable period of time. The techniques herein also allow blocking access to a particular cloud service (e.g., an encrypted cloud service), where the cloud service responds with many different IP address answers for the same hostname, either for load balancing or failover.

While there have been shown and described illustrative embodiments that provide for using DNS queries for managing ACLs, it is to be understood that various other adaptations and modifications may be made within the spirit and scope of the embodiments herein. For example, the embodiments have been shown and described herein with relation to certain protocols, such as DHCP, DNS protocols, etc. However, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

receiving, at a caching resolver, a name server query from an end device for an Internet Protocol (IP) address for a hostname using cloud-based resources;

determining whether the hostname requested is in an access control list (ACL), wherein the ACL includes an initial IP address associated with the hostname in an Access Control Entry (ACE);

in response to the hostname being in the ACL:

examining a received response to the name server query for the hostname, wherein the received response contains a particular IP address for the hostname;

determining whether the ACE associated with hostname includes the particular IP address; and in response to the ACE not including the particular IP address, adding the particular IP address to the ACE to update the ACL; and returning, by the caching resolver, the received response to the end device, wherein updates to the ACL with regards to the end device are maintained until communications with the end device and the particular IP address have ceased.

2. The method as in claim 1, wherein the ACL is local to the caching resolver.

3. The method as in claim 2, wherein the caching resolver is configured as at least one of a switch, router, and a firewall.

4. The method as in claim 1, wherein adding the particular IP address for the hostname to the ACL comprises:

sending a message to a remote ACL-maintaining device that maintains the ACL.

5. The method as in claim 4, wherein the remote ACL-maintaining device is configured as at least one of a switch, router, and a firewall.

6. The method as in claim 4, wherein sending the message uses a programmatic interface configuration by the caching resolver to configure the remote ACL-maintaining device.

7. The method as in claim 4, wherein adding the particular IP address for the hostname to the ACL comprises:

determining which particular networks are of interest to the ACL-maintaining device; and adding the particular IP address for the hostname to the ACL in response to the particular IP address being within a particular network of interest to the ACL-maintaining device.

8. The method as in claim 1, further comprising:

returning the received response to the end device.

9. The method as in claim 1, wherein the particular IP address for the hostname is added as an access control entry (ACE) into the ACL that is specific to the end device.

10. The method as in claim 1, further comprising:

caching the particular IP address for the hostname in the ACL for a lifetime of communication between the end device and the particular IP address.

11. The method as in claim 10, further comprising:

clearing the cached particular IP address for the hostname in the ACL in response to a connection termination flag in a message between the end device and the particular IP address.

12. The method as in claim 1, further comprising:

caching the particular IP address for the hostname in the ACL for a configured period of time.

13. The method as in claim 1, further comprising:
applying caching semantics to the particular IP address for the hostname in the ACL based on caching semantics found in the received response.

14. The method as in claim 1, further comprising:
configuring an address of the caching resolver on the end device via a dynamic host configuration protocol (DHCP) name-server option.

15. An apparatus, comprising:
one or more network interfaces to communicate in a computer network;
a processor coupled to the network interfaces and adapted to execute one or more processes; and
a memory configured to store a caching resolver process executable by the processor, the process when executed operable to:
receive a name server query from an end device for an Internet Protocol (IP) address for a hostname using cloud-based resources;
determine whether the hostname requested is in an access control list (ACL), wherein the ACL includes an initial IP address associated with the hostname in an Access Control Entry (ACE);
in response to the hostname being in the ACL:
examine a received response to the name server query for the hostname, wherein the received response contains a particular IP address for the hostname;
determine whether the ACE associated with hostname includes the particular IP address; and
in response to the ACE not including the particular IP address, add IP address to the ACE to update the ACL; and
return the received response to the end device, wherein updates to the ACL with regards to the end device are maintained until communications with the end device and the particular IP address have ceased.

16. The apparatus as in claim 15, wherein the ACL is local to the caching resolver process on the apparatus.

17. The apparatus as in claim 16, wherein the apparatus is configured as at least one of a switch, router, and a firewall.

18. The apparatus as in claim 15, wherein the process when executed to add the particular IP address for the hostname to the ACL is further operable to:
send a message to a remote ACL-maintaining device that maintains the ACL.

19. The apparatus as in claim 18, wherein the process when executed to add the particular IP address for the hostname to the ACL is further operable to:
determine which particular networks are of interest to the ACL-maintaining device; and
add the particular IP address for the hostname to the ACL in response to the particular IP address being within a particular network of interest to the ACL-maintaining device.

20. The apparatus as in claim 15, wherein the process when executed is further operable to:
cache the particular IP address for the hostname in the ACL for one of either a lifetime of communication between the end device and the particular IP address or a configured period of time.

21. A method, comprising:
maintaining, by a network device, an access control list (ACL) for Internet Protocol (IP) addresses for hostnames, wherein the ACL includes an initial IP address associated with the hostname in an Access Control Entry (ACE);
communicating, by the network device, with a caching resolver that receives name server queries from end devices associated with the network device for IP addresses for hostnames and receives responses to the name server queries;
receiving, at the network device from the caching resolver, a particular IP address for a particular hostname that is in the ACL and uses cloud-based resources;
determining whether the ACE associated with hostname includes the particular IP address; and
in response to the ACE not including the particular IP address, adding the particular IP address for the particular hostname to the ACE to update the ACL, wherein updates to the ACL with regards to the end device are maintained until communications with a particular end device and the particular IP address have ceased.

22. The method as in claim 21, further comprising:
informing the caching resolver which particular networks are of interest to the network device, wherein the particular IP address for the particular hostname is received from the caching resolver in response to the particular IP address being within a particular network of interest to the network device.

23. An apparatus, comprising:
one or more network interfaces to communicate in a computer network;
a processor coupled to the network interfaces and adapted to execute one or more processes; and
a memory configured to store a process executable by the processor, the process when executed operable to:
maintain an access control list (ACL) for Internet Protocol (IP) addresses for hostnames, wherein the ACL includes an initial IP address associated with the hostname in an Access Control Entry (ACE);
communicate with a caching resolver that receives name server queries from end devices associated with the network device for IP addresses for hostnames and receives responses to the name server queries;
receive, from the caching resolver, a particular IP address for a particular hostname that is in the ACL and uses cloud-based resources;
determine whether the ACE associated with hostname includes the particular IP address; and
in response to the ACE not including the particular IP address, add the particular IP address for the particular hostname to the ACE to update the ACL, wherein updates to the ACL with regards to the end device are maintained until communications with a particular end device and the particular IP address have ceased.

* * * * *